UNITED STATES PATENT OFFICE.

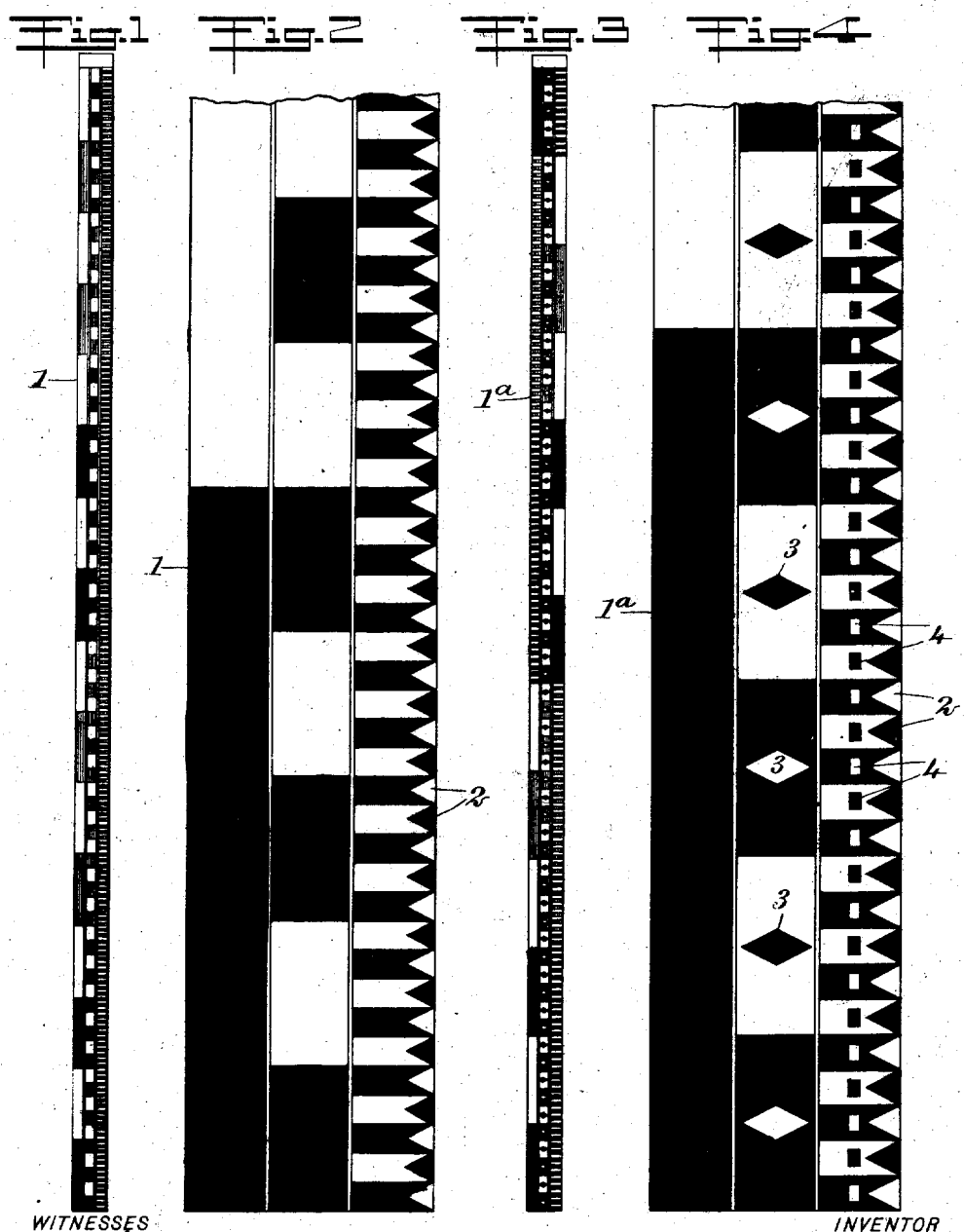

JAMES HAST ROBERTSON, OF WILY, VIRGINIA.

COMBINED LEVELING AND STADIA ROD.

No. 868,365.

Specification of Letters Patent.

Patented Oct. 15, 1907.

Application filed May 20, 1907. Serial No. 374,571.

*To all whom it may concern:*

Be it known that I, JAMES HAST ROBERTSON, a citizen of the United States, and a resident of Wily, in the county of Buckingham and State of Virginia, have invented a new and Improved Combined Leveling and Stadia Rod, of which the following is a full, clear, and exact description.

This invention has reference to improvements in combined stadia and leveling rods, and its object is to improve their graduations in such manner that distances and levels may be determined at both long and short range with celerity and certainty. This object is accomplished by a combination of colors, columns, and simple diagrams, the colors alternating with each other and dividing the rod transversely into several sections, each section representing the greatest division of the rod. The diagrams are preferably arranged in three columns with the length of the subdivisions of each column, in passing from a column of smaller to larger subdivisions, being a constant multiple of the next succeeding column. By this arrangement and construction the graduations are clear and distinct at long ranges, enabling the reading to be quickly and accurately made.

Reference is to be had to the accompanying drawings forming a part of this specification, in which similar characters of reference indicate corresponding parts in all the figures.

Figure 1 is a front face view of a combined leveling and stadia rod graduated in accordance with my invention; Fig. 2 is a fragmentary view of the same on an enlarged scale; Fig. 3 is a view corresponding to Fig. 1 illustrating a slightly modified form and arrangement of the graduations, and Fig. 4 is a fragmentary view of the rod shown in Fig. 3.

Referring more especially to Figs. 1 and 2, 1 indicates a combined leveling and stadia rod having the front face thereof divided longitudinally into three columns, each column being divided into a plurality of equal subdivisions or graduations, the length of the subdivisions of each column, in passing from a column of smaller to larger subdivisions, being a constant multiple of the next succeeding column, the multiple which I have selected in the present embodiment of my invention being the multiple 5: in other words,—the length of the graduations of the left hand column as the reader faces the drawing, is five times the length of the graduations of the intermediate column, and the graduations of the intermediate column are five times the length of the graduations in the column at the right hand side of the rod.

The graduations on the front face of the rod are produced in different colors alternating with each other and dividing the rod transversely into a series of sections, each section being preferably of the length of four graduations of the column having the longest subdivisions. The column of graduations having the shortest subdivisions, which is here shown as arranged at the right of the rod, are each bisected by reëntrant angles 2 entering the subdivision adjacent to the outside of the rod, as illustrated in the enlarged fragmentary face view shown in Fig. 2.

In practice I preferably make the length of the different-colored sections of the rod twenty poles, the length of the graduations in the column having the longest subdivisions will then be five poles, the subdivisions of the intermediate column will then be one pole and the graduations of the column having the shortest subdivisions will be one-fifth of a pole, and one-half of each of the smallest subdivisions produced by the reëntrant angles will be one-tenth of a pole.

To read the rod, the observer fixes the top stadia wire coincident with some main division on the rod and takes in at a glance all of the twenty-pole sections between the wires, then all of the five-pole subdivisions in the first column of graduations, then all of the one-pole subdivisions of the intermediate column, then all of the fractional parts of the pole of the third column so far as the same may be visible. If the distance is greater than one-fourth of a mile, the central, horizontal wire of the telescope can be used in connection with either the bottom or top stadia wire thereof, and distances up to half-a-mile can be read on the rod. The larger divisions of the rod are not confused by the subdivisions but can be distinctly seen after the subdivisions disappear.

In the rod $1^a$ illustrated in Figs. 3 and 4, the arrangement and construction of the graduations differ slightly from those appearing on the rod 1. This difference chiefly resides in making the length of the alternately colored section three feet instead of twenty poles and in reversing the position of the largest and smallest subdivisions in every other pair of adjacent sections, whereby the smallest and largest subdivisions appear on one pair of adjacent and different colored sections at the opposite side of the rod from that of the next succeeding pair of different-colored sections, this arrangement being for the purpose of reading differences of levels. The subdivisions of the intermediate column in this form of my invention are also different from the corresponding divisions on the rod 1 in that the former are each provided with a bisecting, diamond-shaped figure 3; also the smallest subdivisions are provided with rectangles 4 which, in connection with the reëntrant angles 2, enable one-fourth of the length of each of the smallest subdivisions to be accurately read. While for stadia reading, the graduations are symbols, representing any units of measure whatever; for level reading, these same graduations are taken at their actual value. To read the rod for leveling, if the horizontal wire intersects the rod on a black space with small graduations on the right (presuming the graduations to be in feet), the reading is known to be in the first 3 feet; if the intersection is on a red space with small graduations on the right, the reading is 3 feet plus the part of the red space below the wire; if on a black space with small graduations on the left, the reading is 6 feet plus the part of the black space below the wire; if on a red space with small graduations on the left, the reading is 9 feet plus the part of the red space below the wire.

It is obvious that various forms of graduations involving the principles of my invention may be resorted to within the scope of the annexed claims.

Having thus described my invention I claim as new and desire to secure by Letters Patent is:

1. A stadia rod having a face divided transversely into a plurality of sections of equal length and of different colors alternating with each other, each section representing the greatest division of the rod and itself divided into three or more graduated columns, the length of the subdivisions of each column, in passing from a column of smaller to larger subdivisions, being a constant multiple of the next succeeding column.

2. A stadia rod having a face divided longitudinally into three or more graduated columns, the length of the subdivisions of each column in passing from a column of smaller to larger subdivisions, being a constant multiple of the next succeeding column.

3. A stadia rod having a face divided longitudinally into a plurality of graduated columns, the length of the subdivisions of each column being a multiple of the length of the subdivisions of the adjacent column, and successively increasing or decreasing in passing from one side of the rod to the other and reëntrant angles at one edge of the rod bisecting the smallest subdivisions.

4. A stadia rod having a face divided longitudinally into three or more graduated columns, the length of the subdivisions of each column, in passing from a column of smaller to larger subdivisions, being a constant multiple of the next succeeding column, and reëntrant angles arranged at one edge of the rod bisecting the smallest subdivisions.

5. A stadia and leveling rod having a face divided longitudinally into a plurality of graduated columns, the length of the subdivisions of one column being a multiple of the subdivisions of the next adjacent column, said columns being transversely divided into equidistant sections alternating in color, with the smallest and largest subdivisions in the columns of a number of sections being arranged at reverse sides of the rod from that occupied by the corresponding subdivisions in the columns of or like number of succeeding sections.

6. A stadia and leveling rod having a face divided longitudinally into a plurality of graduated columns, the length of the subdivisions of one column being a multiple of the length of the subdivisions of the next adjacent column, said columns being transversely divided into equidistant sections of different colors alternating with each other, with the smallest and largest subdivisions in the columns of alternate pairs of sections being arranged at opposite sides of the rod from the corresponding subdivisions in the next succeeding pairs of sections.

7. A stadia and leveling rod having a face divided longitudinally into a plurality of graduated columns, the length of the subdivisions of one column being a multiple of the length of the subdivisions of the next adjacent column, and successively increasing or decreasing in passing from one side of the rod to the other each subdivision of the column having the shortest subdivisions being bisected by a reëntrant angle, and a figure located on each short subdivision operating, in connection with the reëntrant angle, to divide said subdivision into four parts.

8. A stadia and leveling rod having a face longitudinally divided into three graduated columns, the length of the subdivisions of each column in passing from a column of smaller to larger subdivisions, being a multiple of the next succeeding column, reëntrant angles formed at one edge of the rod bisecting the subdivisions of one of said columns, said last-named subdivisions each having a rectangular figure thereon operating in connection with its respective reëntrant angle to divide the subdivision into four parts, and a diamond-shaped figure bisecting each subdivision of the intermediate column.

In testimony whereof I have signed my name to this specification in the presence of two subscribing witnesses.

JAMES HAST ROBERTSON.

Witnesses:
G. A. ELCOR,
L. C. MOSELEY.

---

It is hereby certified that the name of the patentee in Letters Patent No. 868,365, granted October 15, 1907, for an improvement in "a Combined Leveling and Stadia Rod," was erroneously written and printed "James Hast Robertson," whereas said name should have been written and printed *James Hart Robertson*, and the name of the first-mentioned witness should be *G. A. Elcan* instead of "G. A. Elcor;" and that the said Letters Patent should be read with these corrections therein that the same may conform to the record of the case in the Patent Office.

Signed and sealed this 7th day of January, A. D., 1908.

[SEAL.]

C. C. BILLINGS,
*Acting Commissioner of Patents.* feet), the reading is known to be in the first 3 feet; if the intersection is on a red space with small graduations on the right, the reading is 3 feet plus the part of the red space below the wire; if on a black space with small graduations on the left, the reading is 6 feet plus the part of the black space below the wire; if on a red space with small graduations on the left, the reading is 9 feet plus the part of the red space below the wire.

It is obvious that various forms of graduations involving the principles of my invention may be resorted to within the scope of the annexed claims.

Having thus described my invention I claim as new and desire to secure by Letters Patent is:

1. A stadia rod having a face divided transversely into a plurality of sections of equal length and of different colors alternating with each other, each section representing the greatest division of the rod and itself divided into three or more graduated columns, the length of the subdivisions of each column, in passing from a column of smaller to larger subdivisions, being a constant multiple of the next succeeding column.

2. A stadia rod having a face divided longitudinally into three or more graduated columns, the length of the subdivisions of each column in passing from a column of smaller to larger subdivisions, being a constant multiple of the next succeeding column.

3. A stadia rod having a face divided longitudinally into a plurality of graduated columns, the length of the subdivisions of each column being a multiple of the length of the subdivisions of the adjacent column, and successively increasing or decreasing in passing from one side of the rod to the other and reëntrant angles at one edge of the rod bisecting the smallest subdivisions.

4. A stadia rod having a face divided longitudinally into three or more graduated columns, the length of the subdivisions of each column, in passing from a column of smaller to larger subdivisions, being a constant multiple of the next succeeding column, and reëntrant angles arranged at one edge of the rod bisecting the smallest subdivisions.

5. A stadia and leveling rod having a face divided longitudinally into a plurality of graduated columns, the length of the subdivisions of one column being a multiple of the subdivisions of the next adjacent column, said columns being transversely divided into equidistant sections alternating in color, with the smallest and largest subdivisions in the columns of a number of sections being arranged at reverse sides of the rod from that occupied by the corresponding subdivisions in the columns of or like number of succeeding sections.

6. A stadia and leveling rod having a face divided longitudinally into a plurality of graduated columns, the length of the subdivisions of one column being a multiple of the length of the subdivisions of the next adjacent column, said columns being transversely divided into equidistant sections of different colors alternating with each other, with the smallest and largest subdivisions in the columns of alternate pairs of sections being arranged at opposite sides of the rod from the corresponding subdivisions in the next succeeding pairs of sections.

7. A stadia and leveling rod having a face divided longitudinally into a plurality of graduated columns, the length of the subdivisions of one column being a multiple of the length of the subdivisions of the next adjacent column, and successively increasing or decreasing in passing from one side of the rod to the other each subdivision of the column having the shortest subdivisions being bisected by a reëntrant angle, and a figure located on each short subdivision operating, in connection with the reëntrant angle, to divide said subdivision into four parts.

8. A stadia and leveling rod having a face longitudinally divided into three graduated columns, the length of the subdivisions of each column in passing from a column of smaller to larger subdivisions, being a multiple of the next succeeding column, reëntrant angles formed at one edge of the rod bisecting the subdivisions of one of said columns, said last-named subdivisions each having a rectangular figure thereon operating in connection with its respective reëntrant angle to divide the subdivision into four parts, and a diamond-shaped figure bisecting each subdivision of the intermediate column.

In testimony whereof I have signed my name to this specification in the presence of two subscribing witnesses.

JAMES HAST ROBERTSON.

Witnesses:
G. A. ELCOR,
L. C. MOSELEY.

---

It is hereby certified that the name of the patentee in Letters Patent No. 868,365, granted October 15, 1907, for an improvement in "a Combined Leveling and Stadia Rod," was erroneously written and printed "James Hast Robertson," whereas said name should have been written and printed *James Hart Robertson*, and the name of the first-mentioned witness should be *G. A. Elcan* instead of "G. A. Elcor;" and that the said Letters Patent should be read with these corrections therein that the same may conform to the record of the case in the Patent Office.

Signed and sealed this 7th day of January, A. D., 1908.

[SEAL.]

C. C. BILLINGS,
*Acting Commissioner of Patents.*

It is hereby certified that the name of the patentee in Letters Patent No. 868,365, granted October 15, 1907, for an improvement in "a Combined Leveling and Stadia Rod," was erroneously written and printed "James Hast Robertson," whereas said name should have been written and printed *James Hart Robertson*, and the name of the first-mentioned witness should be *G. A. Elcan* instead of "G. A. Elcor;" and that the said Letters Patent should be read with these corrections therein that the same may conform to the record of the case in the Patent Office.

Signed and sealed this 7th day of January, A. D., 1908.

[SEAL.]

C. C. BILLINGS,
*Acting Commissioner of Patents.*